US009429640B2

(12) United States Patent
Rudow et al.

(10) Patent No.: US 9,429,640 B2
(45) Date of Patent: Aug. 30, 2016

(54) OBTAINING PSEUDORANGE INFORMATION USING A CELLULAR DEVICE

(71) Applicant: Trimble Navigation Limited, Sunnyvale, CA (US)

(72) Inventors: Richard Rudow, Mesa, AZ (US); Venkateswaran Kasirajan, Tamil Nadu (IN); Robert Wold, Phoenix, AZ (US); James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 291 days.

(21) Appl. No.: 13/842,447

(22) Filed: Mar. 15, 2013

(65) Prior Publication Data

US 2014/0187193 A1    Jul. 3, 2014

Related U.S. Application Data

(60) Provisional application No. 61/746,916, filed on Dec. 28, 2012.

(51) Int. Cl.

| | |
|---|---|
| H04M 11/04 | (2006.01) |
| H04W 24/00 | (2009.01) |
| G01S 19/39 | (2010.01) |
| G01S 19/41 | (2010.01) |
| G01S 19/07 | (2010.01) |
| G01S 5/00 | (2006.01) |
| H04M 3/00 | (2006.01) |

(Continued)

(52) U.S. Cl.
CPC ............. *G01S 5/00* (2013.01); *G01S 19/25* (2013.01); *G01S 19/41* (2013.01); *G01S 19/43* (2013.01); *G01S 19/49* (2013.01); *H04M 3/00* (2013.01); *H04W 64/00* (2013.01); *H04M 2250/10* (2013.01)

(58) Field of Classification Search
CPC ................................ H04W 64/00; H04W 4/02
USPC ........................ 455/405, 456.1–456.6, 457; 342/357.22, 357.24, 357.44
See application file for complete search history.

(56) References Cited

U.S. PATENT DOCUMENTS

| | | |
|---|---|---|
| 5,225,842 A | 7/1993 | Brown et al. |
| 5,345,244 A | 9/1994 | Gildea et al. |

(Continued)

FOREIGN PATENT DOCUMENTS

| | | |
|---|---|---|
| EP | 0508405 | 10/1992 |
| EP | 1729145 A1 | 12/2006 |

(Continued)

OTHER PUBLICATIONS

"PCT/US2013/078125 International Search Report and Written Opinion", Apr. 23, 2014, 25 pages.

(Continued)

*Primary Examiner* — Dung Hong
(74) *Attorney, Agent, or Firm* — Kilpatrick Townsend & Stockton LLP

(57) ABSTRACT

The cellular device accesses a GPS/GNSS chipset embedded within the cellular device. The GPS/GNSS chipset calculates pseudorange information for use by the GPS/GNSS chipset. The cellular device extracts the pseudorange information from the GPS/GNSS chipset for use elsewhere in the cellular device outside of the GPS/GNSS chipset.

35 Claims, 9 Drawing Sheets

(51) Int. Cl.
  *H04W 64/00* (2009.01)
  *G01S 19/25* (2010.01)
  *G01S 19/43* (2010.01)
  *G01S 19/49* (2010.01)

(56) References Cited

U.S. PATENT DOCUMENTS

| | | | |
|---|---|---|---|
| 5,379,224 A | 1/1995 | Brown et al. | |
| 5,471,217 A | 11/1995 | Hatch et al. | |
| 5,477,228 A | 12/1995 | Tiwari et al. | |
| 5,523,761 A | 6/1996 | Gildea | |
| 5,594,454 A | 1/1997 | Devereux et al. | |
| 5,621,416 A | 4/1997 | Lennen | |
| 5,740,048 A * | 4/1998 | Abel | G01C 21/165 701/470 |
| 5,805,108 A | 9/1998 | Lennen | |
| 5,862,501 A | 1/1999 | Talbot et al. | |
| 5,899,957 A | 5/1999 | Loomis | |
| 5,903,235 A | 5/1999 | Nichols | |
| 5,913,170 A * | 6/1999 | Wortham | G01S 5/0263 342/357.31 |
| 6,067,046 A | 5/2000 | Nichols | |
| 6,072,431 A * | 6/2000 | Froeberg | G01S 19/37 342/357.31 |
| 6,249,245 B1 * | 6/2001 | Watters | G01S 5/0027 342/357.4 |
| 6,324,473 B1 | 11/2001 | Eschenbach | |
| 6,408,178 B1 * | 6/2002 | Wickstrom | G01S 19/46 342/352 |
| 6,429,808 B1 | 8/2002 | King et al. | |
| 6,430,503 B1 | 8/2002 | McBurney et al. | |
| 6,473,030 B1 | 10/2002 | McBurney et al. | |
| 6,507,738 B1 | 1/2003 | Allison et al. | |
| 6,510,387 B2 | 1/2003 | Fuchs et al. | |
| 6,590,525 B2 | 7/2003 | Yule et al. | |
| 7,003,112 B1 | 2/2006 | Froeberg | |
| 7,043,364 B2 | 5/2006 | Scherzinger | |
| 7,151,489 B2 | 12/2006 | Pande et al. | |
| 7,191,097 B1 | 3/2007 | Lee et al. | |
| 7,333,794 B2 * | 2/2008 | Zappala | H04W 24/08 455/404.1 |
| 7,480,511 B2 | 1/2009 | O'Meagher | |
| 7,570,204 B1 | 8/2009 | McGraw et al. | |
| 7,908,106 B2 | 3/2011 | Cho et al. | |
| 7,961,141 B2 | 6/2011 | Dai et al. | |
| 8,024,144 B2 | 9/2011 | Kludas et al. | |
| 8,032,152 B2 | 10/2011 | Manson et al. | |
| 8,044,852 B2 | 10/2011 | Green et al. | |
| 8,068,848 B2 | 11/2011 | Manson et al. | |
| 8,068,849 B2 | 11/2011 | Manson et al. | |
| 8,078,192 B2 | 12/2011 | Wirola et al. | |
| 8,081,987 B2 | 12/2011 | Manson et al. | |
| 8,081,988 B2 | 12/2011 | Manson et al. | |
| 8,081,989 B2 | 12/2011 | Manson et al. | |
| 8,085,196 B2 | 12/2011 | Whitehead | |
| 8,085,387 B2 | 12/2011 | Kludas et al. | |
| 8,095,149 B2 | 1/2012 | Manson et al. | |
| 8,134,497 B2 | 3/2012 | Janky et al. | |
| 8,136,545 B2 | 3/2012 | Jablonski | |
| 8,242,956 B2 | 8/2012 | Lamance et al. | |
| 8,339,311 B2 | 12/2012 | Walley et al. | |
| 8,368,875 B2 | 2/2013 | Kludas et al. | |
| 8,447,519 B2 | 5/2013 | Basnayake et al. | |
| 8,699,409 B2 | 4/2014 | Aryan et al. | |
| 8,719,188 B2 | 5/2014 | Kuhn et al. | |
| 9,037,527 B2 | 5/2015 | Kuhn et al. | |
| 2001/0017599 A1 * | 8/2001 | Yule | G01S 19/34 342/357.74 |
| 2002/0072854 A1 * | 6/2002 | Fuchs | G01S 5/0036 701/469 |
| 2002/0186180 A1 | 12/2002 | Duda | |
| 2005/0064878 A1 | 3/2005 | O'Meagher et al. | |
| 2005/0104774 A1 | 5/2005 | Pande et al. | |
| 2006/0146136 A1 | 7/2006 | Cho et al. | |
| 2008/0263097 A1 | 10/2008 | Manson et al. | |
| 2008/0319664 A1 | 12/2008 | Kremin et al. | |
| 2009/0083430 A1 * | 3/2009 | Edge | H04L 63/08 709/228 |
| 2009/0093959 A1 | 4/2009 | Scherzinger et al. | |
| 2009/0189804 A1 | 7/2009 | Ashjaee et al. | |
| 2009/0262016 A1 | 10/2009 | Wirola et al. | |
| 2010/0057359 A1 * | 3/2010 | Caballero | G01C 21/165 701/472 |
| 2010/0079333 A1 | 4/2010 | Janky et al. | |
| 2010/0141510 A1 | 6/2010 | Dai et al. | |
| 2010/0231443 A1 | 9/2010 | Whitehead | |
| 2010/0260150 A1 * | 10/2010 | Aryan | G01S 5/0284 370/336 |
| 2011/0018761 A1 * | 1/2011 | Walley | G01S 19/35 342/357.28 |
| 2011/0064312 A1 | 3/2011 | Janky et al. | |
| 2011/0163914 A1 * | 7/2011 | Seymour | G01S 19/05 342/357.42 |
| 2011/0187590 A1 | 8/2011 | Leandro | |
| 2011/0195687 A1 * | 8/2011 | Das | H04W 4/02 455/404.2 |
| 2011/0267230 A1 | 11/2011 | Lamance et al. | |
| 2011/0285587 A1 * | 11/2011 | Vollath | G01S 19/07 342/357.62 |
| 2012/0116676 A1 | 5/2012 | Basnayake et al. | |
| 2012/0163656 A1 | 6/2012 | Wang et al. | |
| 2012/0166137 A1 | 6/2012 | Grässer et al. | |
| 2012/0330601 A1 | 12/2012 | Soubra et al. | |
| 2013/0027246 A1 | 1/2013 | Hadef et al. | |
| 2013/0029634 A1 * | 1/2013 | Li | H04W 4/22 455/404.2 |
| 2013/0183924 A1 * | 7/2013 | Saigh | H04W 4/025 455/404.2 |
| 2013/0243250 A1 | 9/2013 | France et al. | |
| 2013/0307685 A1 * | 11/2013 | Sholder | G08B 21/02 340/539.12 |
| 2014/0081571 A1 | 3/2014 | Briggs et al. | |
| 2014/0184442 A1 | 7/2014 | Large et al. | |
| 2014/0187193 A1 | 7/2014 | Rudow et al. | |
| 2014/0240170 A1 | 8/2014 | Rudow et al. | |
| 2014/0253375 A1 | 9/2014 | Rudow et al. | |
| 2014/0292569 A1 | 10/2014 | Wallace et al. | |
| 2014/0292570 A1 | 10/2014 | Wallace et al. | |
| 2014/0375493 A1 | 12/2014 | Weisenburger et al. | |
| 2014/0378170 A1 | 12/2014 | Rudow et al. | |
| 2014/0378171 A1 | 12/2014 | Rudow et al. | |
| 2015/0009067 A1 | 1/2015 | Rudow et al. | |
| 2015/0043012 A1 | 2/2015 | Rudow et al. | |
| 2015/0045058 A1 | 2/2015 | Rudow et al. | |
| 2015/0045059 A1 | 2/2015 | Rudow et al. | |
| 2015/0050907 A1 | 2/2015 | Rudow et al. | |
| 2015/0057028 A1 | 2/2015 | Rudow et al. | |
| 2015/0289097 A1 | 10/2015 | Rudow et al. | |

FOREIGN PATENT DOCUMENTS

| | | |
|---|---|---|
| EP | 2275778 A1 | 1/2011 |
| KR | 20110085744 | 7/2011 |
| KR | 101241171 B1 | 3/2013 |
| WO | 2005/045458 | 5/2005 |
| WO | 2008089792 A1 | 7/2008 |
| WO | 2009074654 A1 | 6/2009 |
| WO | 2011120141 A1 | 10/2011 |

OTHER PUBLICATIONS

Afzal, "Design Methodology for Dual Frequency Configurable GPD Receiver", ION GNSS 2010, Session E5, Portland, OR, Sep. 21-24, 2010, 9 Pages.

Brown, "TIDGET Mayday System for Motorists", Presented at IEEE Position Location and Navigation Symposium (PLANS) '94 Las Vegas, NV, Apr. 1994, 7 pages.

Rho, "Dual-Frequency GPS Precise Point Positioning with WADGPS Corrections", Department of Geodesy and Geomatics Engineering, University of new Brunswick, Fredericton, N.B. Canada, Sep. 13-16, 2005, 1470-1482.

(56) References Cited

OTHER PUBLICATIONS

"RTK Bridge-E", Intuicom, Inc. www.intuicom.com, 2 pages.
"Spirit Level with bubble", https://play.google.com/store/apps/details?id=com.zabaanapps.android.level, Mar. 25, 2014, 2 Pages.
"Technical Tips from Inland GPS", Trimble TSC2—RTK over internet—establishing IP Connection, Jun. 14, 2011, 8 pages.
"Theodolite", Hunter Research & Technology, Mar. 24, 2014, 1 Page.
"Trimble S8 Total Station Datasheet", Trimble Navigation Limited, 2013, 4 Pages.
"Wireless RTK Bridge—Cellular User Guide", Revision 1.4, 2009, 47 pages.
IKE, "Spike: Laser Accurate Measurement & Modeling on Smartphones", https://www.kickstarter.com/projects/ikegps/spike-laser-accurate-measurement-and-modelling-on?ref=nav_search, Oct. 2, 2013, 14 Pages.
Hatch, "The Synergism of GPS Code and Carrier Measurements", Proceedings of the Third International Geodetic Symposium on Satellite Doppler Positioning, 1982, 1213-1232.
Landau, et al., "Virtual Reference Stations Versus Broadcast Solutions in Network RTK", GNSS 2003, Graz, Austria, Apr. 2003, 15 pages.
Thipparthi, "Imporving Prositional Accuracy Using Carrier Smoothing Techniques in Inexpensive GPS Receivers", MSEE Thesis, New Menixo State University, Las Cruces, NM, Feb. 2004, 101 Pages.
"Comparison of Photogrammetry Software", http://en.wikipedia.org/wiki/Comparison_of photogrammetry_software, Jul. 8, 2015, 4 pages.
"Photogrammetry", http://en.wikipedia.org/wiki/Photogrammetry, Jun. 25, 2015, 5 pages.
"Pi Pelican Imaging: Life in 3D", http://www.pelicanimaging.com, 2015, 3 pages.
Church, "Close Range Photogrammetry vs. 3D Scanning of Archeological Documentation", http://ncptt.nps.gov/blog/close-range-photogrammetry-vs-3d-scanning-for-archaeological-documentation/, Nov. 6, 2012, 10 pages.
Grussenmeyer, et al., "A comparison of photogrammetry software packages for the documentation of buildings", http://halshs.archives-ouvertes.fr/docs/00/28/12/54/PDF/grussenmeyer_alkhalil_FIG2000.PDF, May 21, 2008, 9 pages.
"PCT/US2015/035328 International Search Report", Oct. 15, 2015, pp. 1-13.
"PCT/US2015/035346 International Search Report", Oct. 13, 2015, pp. 1-12.
Afzal, "Design Methodology for a Dual Frequency Configurable GPS Receiver", Proceedings of the 23rd International Technical Meeting of the Satellite Division of the Institute of Navigation (ION GNSS 2010), Sep. 24, 2010, pp. 2892-2900.
Guixens, et al., "System Aspects and Practical Results for Precise Car Navigation with Modern Civil Signals Using a Software Receiver", Proceedings of the 21st International Technical Meeting of the Satellite Division of the Institute of Navigation (ION GNSS 2008), Sep. 19, 2008, pp. 2280-2292.
Haak, "A Multi-Purpose Software GNSS Receiver for Automotive Applications", Proceedings of the 23rd International Technical Meeting of the Satellite Division of the Institute of Navigation (ION GNSS 2010), Sep. 24, 2010, pp. 1869-1874.
Ruegamer, et al., "A Flexible and Portable Multiband GNSS Front-end System", Proceedings of the 25th International Technical Meeting of the Satellite Division of the Institute of Navigation (ION GNSS 2012), Sep. 21, 2012, pp. 2378-2389.

\* cited by examiner

OBTAINING PSEUDORANGE INFORMATION USING A CELLULAR DEVICE

RELATED APPLICATION SECTION

This application claims priority to and benefit of U.S. Patent Application No. 61/746,916 filed on Dec. 28, 2012 entitled "IMPROVED GPS/GNSS ACCURACY FOR A CELL PHONE" by Rudow et al, and assigned to the assignee of the present application.

BACKGROUND

The Global Positioning System (GPS) and its extensions in the Global Navigation Satellite Systems (GNSS) have become thoroughly pervasive in all parts of human society, worldwide. GPS and GNSS receivers in the form of chipsets have become widely incorporated into cell phones and other types of cellular devices with cellular-based communications equipment.

Typically, cellular devices include highly integrated GPS/GNSS chipsets that are designed to work with the E-911 service primarily, and are not designed to provide anywhere near a full range of features and outputs. They do provide a position fix, but are not designed to make available very many other parameters of interest. All GPS/GNSS receivers must acquire, track and decode a data message that conveys information about the location of the satellites in space, and time information. The principal additional parameter obtained is the "pseudorange." However, this set of data is not available as an output from the cell phone GPS chipsets for use by the cellular device itself. In circumstances where it is available, it is under access control by the vendor.

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "accessing," "extracting," "bridging," "determining," "displaying," "performing," "providing," "obtaining," "calculating," "receiving," "storing," "notifying," "matching," "creating," "generating," "communicating," "transmitting," "using," "requesting," "providing," "activating, "deactivating," "initiating," "terminating," "causing," "transforming data," "modifying data to transform the state of a computer system," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview

Cellular devices, such as cell phones and non-voice enabled cellular devices, can provide pseudorange information that can be used in surveying. However, the pseudorange information from cellular device chipsets are only available under a limited set of conditions, usually only when performing a E-911 service call, and then only for use by the Assisted GPS service located in conjunction with the E-911 service facility. Therefore, according to one embodiment, a GPS/GNSS chipset, which calculates pseudorange information for use by the GPS/GNSS chipset, embedded within a cellular device is accessed. The pseudorange information from the GPS/GNSS chipset is extracted for use elsewhere in the cellular device outside of the GPS/GNSS chipset.

Examples of Systems for Obtaining Pseudorange Information

Figure 1:
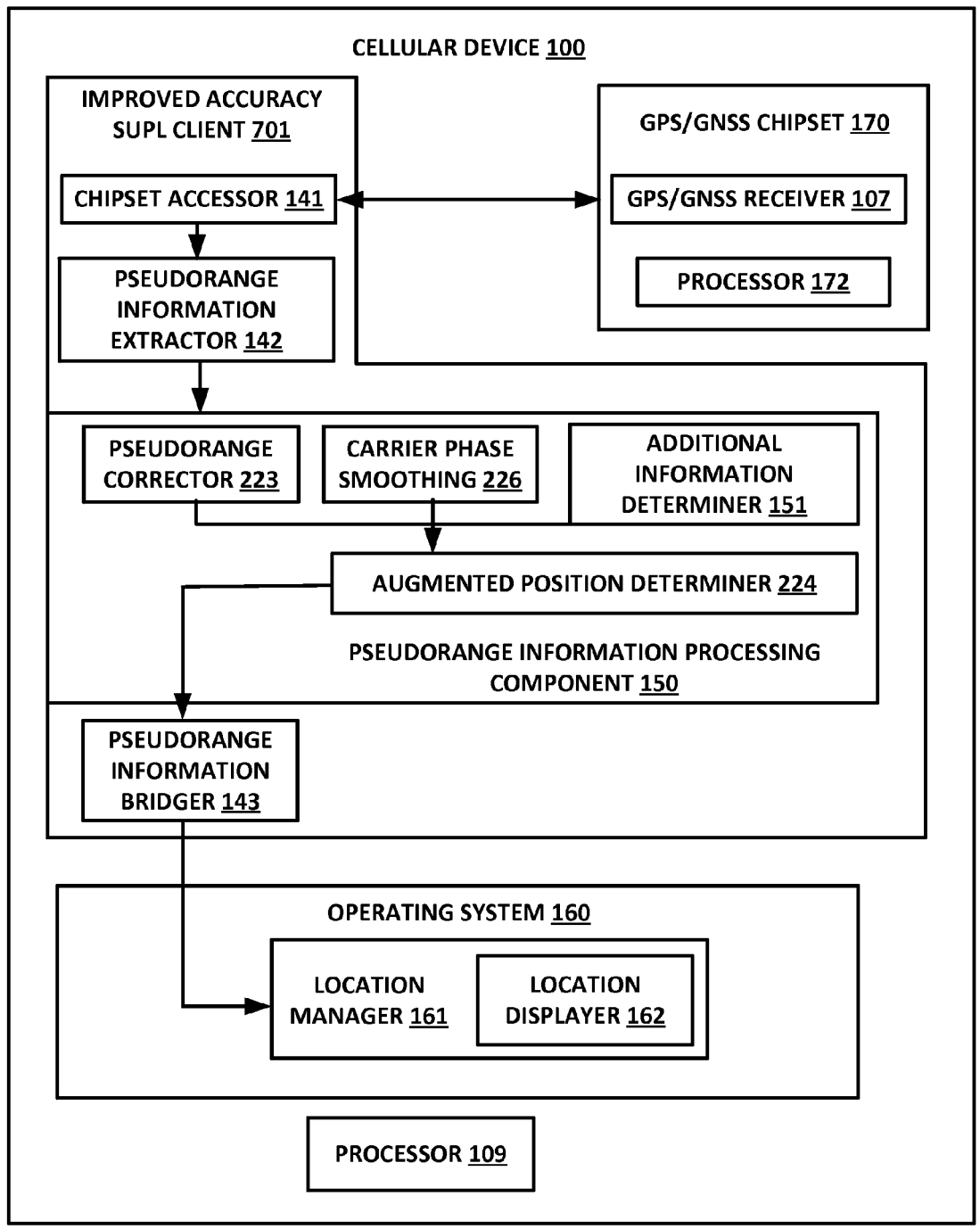
FIG. 1 depicts a block diagram of a cellular device for obtaining pseudorange information, according to one embodiment.

FIG. 1 depicts a block diagram of a cellular device for obtaining pseudorange information, according to one embodiment. Examples of a cellular device 100 include a cell phone, a non-voice enabled cellular device, a Trimble® Juno™, and a Trimble® GeoExplorer®.

As depicted in FIG. 1, the cellular device 100 includes a GPS/GNSS chipset 170, a GPS/GNSS receiver 107, a processor 172 that is part of the GPS/GNSS receiver 107, a chipset accessor 141, a pseudorange information extractor 142, an improved accuracy SUPL client 701, a pseudorange information bridger 143, a pseudorange information processing component 150, an operating system 160, a location manager 161, a location displayer 162, and a processor 109 that is outside of the GPS/GNSS receiver 107. According to one embodiment, the chipset accessor 141, the pseudorange information extractor 142, the pseudorange information processing component 150, and the pseudorange information bridger 143 are a part of the improved accuracy SUPL client 701. According to one embodiment, the pseudorange information processing component 150 includes a pseudorange corrector 223, carrier phase smoothing 226 and an augmented position determiner 224.

According to one embodiment, the processor 172 and the GPS/GNSS receiver 107 are a part of the GPS/GNSS chipset 170. According to one embodiment, the chipset accessor 141, pseudorange information extractor 142, the pseudorange information bridger 143, the improved accuracy SUPL client 701, the operating system 160, and the processor 109 are located in a portion of the cellular device 100 that is outside of the GPS/GNSS chipset 170. The location manager 161 can be a part of the operating system 160 and external to the GPS/GNSS chipset 170. According to one embodiment, the location displayer 162 is a part of the location manager 161. According to one embodiment, the chipset accessor 141, pseudorange information extractor 142, the pseudorange processing component, pseudorange corrector 223, carrier phase smoothing 226, augmented position determiner 224, pseudorange information bridger 143, and improved accuracy SUPL client 701 are application programming interfaces (API) function applications that reside in memory of the cellular device 100 and are executed by a processor 109 of the cellular device 100.

The GPS/GNSS receiver 107 can perform GPS measurements to derive raw measurement data for a position of the cellular device 100. The raw measurement data can provide an instant location of the cellular device 100. According to one embodiment, the raw measurement data is the pseudorange information that is extracted (also referred to as "extracted pseudorange information"). The extracted pseudorange information may be referred to as uncorrected pseudorange information, observed pseudorange information, or unsmoothed pseudorange information. Conventionally, the raw measurement data is only for use by the GPS/GNSS chipset 170 and the GPS/GNSS chipset 170 calculates pseudorange information that is only for use by the GPS/GNSS chipset 170. Examples of pseudorange information are uncorrected pseudorange information, differential GNSS corrections, high precision GNSS satellite orbital data, GNSS satellite broadcast ephermis data, and ionosopheric projections.

The chipset accessor 141 is configured for accessing the GPS/GNSS chipset 170. The pseudorange information extractor 142 is configured to extract the pseudorange information that is accessed. The extracted pseudorange information can be received and stored continuously. The pseudorange information bridger 143 is configured for bridging the pseudorange information from the GPS/GNSS chipset 170 to the location manager 161 that resides in the operating system 160 of the cellular device 100.

According to one embodiment, the chipset accessor 141, the pseudorange information extractor 142, the pseudorange information processing component 150 and pseudorange information bridger 143 are a part of an improved accuracy SUPL client 701. For example, The SUPL client 701 can interface between the GPS/GNSS chipset 170 and the location manager 161, which resides in the operating system 160. The pseudorange information can be obtained from the processor 172 of the GPS/GNSS receiver 107 using a command via a high precision Secure User Platform Location (SUPL).

According to one embodiment, the GPS/GNSS chipset 170 is accessed using an operation that is a session started with a message that is an improved accuracy Secure User Platform Location (SUPL) start message or a high precision SUPL INIT message. According to one embodiment, the message is a custom command that is specific to the GPS/GNSS chipset 170 (also referred to as "a GPS/GNSS chipset custom command") and the improved accuracy SUPL client 701 can have access to the raw measurements of the GPS/GNSS chipset 170.

A worker thread associated with the SUPL client 701 can monitor the raw measurements delivered by the GPS/GNSS chipset 170 into the GPS/GNSS chipset 170's memory buffers, cache the raw measurements and use the raw measurements to determine a position fix. The pseudorange information extractor 142 and the pseudorange information processing component 150 can be associated with the worker thread. For example, the pseudorange information extractor 142 can cache the raw measurements and the pseudorange information processing component 150 can determine the location.

According to one embodiment, the cellular device 100 can improve the accuracy of the extracted pseudorange information. For example, the extracted pseudorange information can be improved by applying pseudorange corrections to the extracted pseudorange information. Examples of an improvement source that provides pseudorange corrections are corrections feeds 640 (FIG. 6), correction service 121, FM radio distribution 126, or satellite radio distributor 127 (FIG. 2), or a combination thereof, as will become more evident. According to one embodiment, an improvement source is located outside of the cellular device 100. A pseudorange corrector 223 can be notified that the pseudorange information is being stored. The pseudorange corrector 223 can improve the accuracy of the pseudorange information by applying pseudorange corrections to the extracted pseudorange information. More specifically, the pseudorange corrections can be received, for example, directly from an improvement source that is located outside of the cellular device 100. A pseudorange correction fetch can be notified to determine if pseudorange corrections are in memory already. If the pseudorange corrections are not already in memory, the pseudorange correction fetch can be notified that pseudorange corrections need to be fetched from an improvement source. The pseudorange corrector 223 can create corrected pseudoranges by applying pseudorange corrections to the extracted pseudorange information. The corrected pseudoranges can be received by the augmented position determiner 224, which can perform a least squared function on the corrected pseudoranges.

In another example, the extracted pseudorange information can be improved by applying carrier phase information to the extracted pseudorange information. More specifically, the extracted pseudorange information can be improved by applying carrier phase information, such as carrier phase and pseudorange signals that is obtained from one or more satellites that are in view of the GPS/GNSS receiver 107, to the extracted pseudorange information. A carrier phase smoothing 226 can create smoothed pseudorange information by applying the carrier phase information to the extracted pseudorange information. The smoothed pseudorange information can be received by the augmented position determiner 224, which can perform a least squared function on the smoothed pseudoranges.

In yet another example, the extracted pseudorange information can be improved by applying additional information that is obtained, for example, from one or more of a compass, gyroscope, accelerometer, and a source accessed via a Wifi or via a short range wireless communication protocol operating in the range of frequencies between 2402-2480 MHz, such as Bluetooth Low Energy (BLE)®. The additional information applicator 151 can obtain and create corrected data by apply the additional information to the extracted pseudorange information. The corrected data can be received by the augmented position determiner 224, which performs a least squared function on the corrected data.

Applying pseudorange corrections, carrier wave information, or additional information to extracted pseudorange information are examples of improving the accuracy of the pseudorange information. In still another example, the extracted pseudorange information is received by the augmented position determiner 224, which performs a least squared function on the extracted pseudorange information without further improvements to the extracted pseudorange information.

The output of the augmented position determiner 224 can be used for determining the location of the cellular device 100. For example, a latitude, longitude and altitude can be determined based on the output of the augmented position determiner 224, which can be displayed by the location displayer 162. When the location has been determined based on an improvement that results from applying pseudorange corrections, carrier wave information, or additional information to the extracted pseudorange information, the location, according to one embodiment, is a position fix of the cellular device 100.

According to one embodiment, a requested mode can be used as a part of determining whether or not to apply any improvements, such as pseudorange corrections, carrier wave information or additional information, to the extracted pseudorange information. For example, if the requested mode requests a location without improvements, the location can be determined without improvements even if improvements are available or can be obtained. If the requested mode requests a position fix, then the location can be determined with improvements if improvements are available.

The characteristics of the GPS/GNSS chipset 170 can be used to determine whether to apply pseudorange corrections, carrier phase information, or additional information. For example, the characteristics of the GPS/GNSS chipset 170 can be used to determine whether the pseudorange corrections or carrier phase information provided by the chipset 170 provides higher accuracy. For example, the pseudorange corrections from some GPS/GNSS chipsets provide higher accuracy than the carrier wave information from those GPS/GNSS chipsets. However, the carrier wave information for other GPS/GNSS chipsets may provide higher accuracy than the pseudorange corrections from the other GPS/GNSS chipsets.

According to one embodiment, a quality of position (QOP) position metric is used to determine whether to improve pseudorange information by applying pseudorange corrections. For example, a QOP position metric can be determined from data obtained from the GPS/GNSS receiver 107. If the QOP position metric is less than a pre-determined QOP, pseudorange corrections are requested from an improvement source. Examples of requested pseudorange corrections are satellite orbital data, high precision ephemeris data, and DGPS/DGNSS corrections.

According to one embodiment, the extracted pseudorange information is observed and uncorrected. Time tags can be used for matching calculated pseudorange correction information obtained from reference stations with observed pseudorange information.

According to one embodiment, the pseudorange information bridger 143 communicates the output of the augmented position determiner 224 to the location manager 161 in the operating system 160. According to one embodiment, the output of the augmented position determiner 224 is a location that is defined in terms of latitude, longitude, and altitude. The location displayer 162 can display the location with respect to a map.

Conventionally, the GPS/GNSS chipsets 130 on cellular device 100s have been designed to deliver pseudorange information to an emergency service when an E-911 call that is made on the same cellular device 100. Therefore, according to one embodiment, the emergency service is an example of an originally intended recipient of the pseudorange information. However, according to various embodiments, the pseudorange information is delivered to a recipient that it was not originally intended for (also referred to as "originally unintended recipient"). For example, the pseudorange information can be delivered to a portion of the cellular device 100 outside of the GPS/GNSS chipset 170. More specifically, a GPS/GNSS chip custom command can be used to access and extract the pseudorange information as discussed herein. In another example, an E-911 operation can be initiated on the cellular device 100, the pseudorange information can be accessed and redirected to a portion of the cellular device 100 outside of the GPS/GNSS chipset 170 and the E-911 operation can be terminated prior to the emergency service being notified and prior to the pseudorange information being transmitted from the GPS/GNSS chipset 170 to the emergency service. According to one embodiment, the pseudorange information is accessed at the originally unintended recipient using the extracted pseudorange information.

Figure 2:
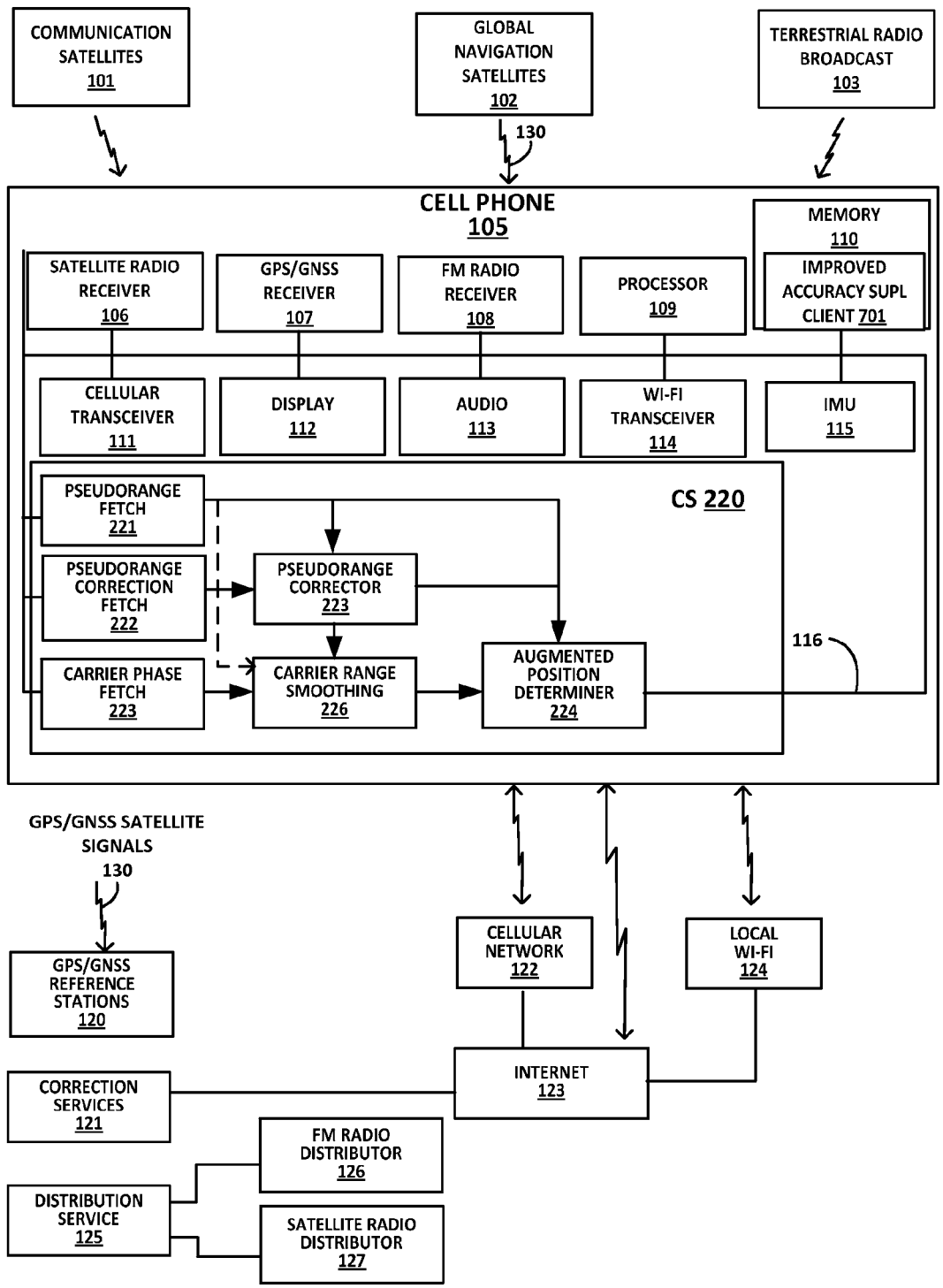
FIG. 2 depicts a block diagram of a cellular device for obtaining pseudorange information, according to one embodiment.

FIG. 2 depicts a block diagram of a cellular device, according to one embodiment. For example, FIG. 2 depicts a cellular device 105 that includes satellite radio receiver 106, GPS/GNSS receiver 107, FM radio receiver 108, processor 109, memory 110, which in turn includes improved accuracy SUPL client 701, cellular transceiver 111, display 112, audio 113, Wi-Fi transceiver 114, IMU 115, pseudorange fetch 221, pseudorange correction fetch 222, pseudorange corrector 223, carrier phase fetch 225, carrier phase smoothing 226, augmented position determiner 224, and bus 116.

The cellular device 105 is directly or indirectly in communication with communication satellites 101, global navigation satellites 102, terrestrial radio broadcast 103, GPS/GNSS reference stations 120, correction services 121, distribution service 125, FM radio distributor 126, satellite radio distributor 127 over various communications links, such as, communications link 130, cellular network 122, Internet 123, and local Wi-Fi 124.

A global navigation satellite system (GNSS) provides a GNSS receiver with the capability to determine its location based on positioning signals transmitted from the GNSS satellites (of the GNSS satellite system) in terms of longitude, latitude, and altitude to within a few meters or even centimeters. GNSS based positioning has a wide range of applications including navigation and tracking and automatic positioning.

Generally, for determining its position, a GNSS receiver first determines distances to a plurality of GNSS satellites. Each individual distance measurement made by the receiver to a satellite located in a known orbit position traces the GNSS receiver on the surface of a spherical shell at the measured distance from the satellite. By taking several such measurements and determining an intersecting point of the spherical shells, a position fix can be generated. The distance measurements to the satellites are based on a time of flight measurement of positioning signals transmitted by the satellites to the receiver and thus the measurements depend on an exact timing. Normally, three distance measurements to three known satellite positions are sufficient to resolve a receiver position in space, however, with the receiver clock offset from satellite clock time being the fourth unknown in the equations, measurements on four satellites are needed to determine the position of the receiver.

The orbit position of the satellite may be determined based on a data message superimposed on a code that serves as a timing reference. The GNSS receiver can compare the time of broadcast at the satellite encoded in the transmission with the time of reception measured by an internal clock at the receiver, thereby measuring the time of flight to the satellite. GNSS systems provide satellite data messages that transmit a code with a timing reference, enabling a GPS/GNSS receiver to compare a successively delayed internal replica of this code with the received code from the satellite. By progressively delaying the local copy, the two signals become aligned in time. That delay is the time needed for the signal to reach the GPS/GNSS receiver, and from this the distance from the satellite can be calculated.

The Real-Time Kinematic (RTK) method was developed to provide greatly improved accuracy in position determination, with a level of precision suitable for use in surveying. RTK positioning performs measurements of the carrier phase of the satellite signals and makes estimates of the exact number of carrier frequency wavelengths (19.6 cm) to each satellite. The method is well-known in the GPS/GNSS positioning arts. To improve the accuracy of the estimation, the RTK method provides reference data on the same set of satellite observables from another source. These reference station observables are often relayed to the rover via ground based radio transmission, in order to enable the receiver to perform the double-differencing process that removes error contributions.

FIG. 2 depicts a plurality of broadcast sources that are used to convey data and media to a cellular device 105, according to one embodiment. As an example, the cellular device 105 can receive broadcast signals from communication satellites 101 (e.g., two-way radio, satellite-based cellular such as the Inmarsat or Iridium communication networks, etc.), global navigation satellites 102, which provide radio navigation signals (e.g., the GPS, GNSS, GLONASS, GALILEO, BeiDou, Compass, etc.), and terrestrial radio broadcast (e.g., FM radio, AM radio, shortwave radio, etc.)

The Cellular device 105 is configured with a satellite radio receiver 106 coupled with a communication bus 116 for receiving signals from communication satellites 101, a GPS/GNSS receiver 107 coupled with bus 116 for receiving radio navigation signals from global navigation satellites 102 and for deriving a position of cellular device 105 based thereon. Cellular device 105 further comprises an FM radio receiver 108 coupled with bus 116 for receiving broadcast signals from terrestrial radio broadcast 103. Other components of cellular device 105 comprise a processor 109 coupled with bus 116 for processing information and instructions, a memory 110 coupled with bus 116 for storing information and instructions for processor 109. It is noted that memory 110 can comprise both volatile memory and non-volatile memory, as well as removable data storage media in accordance with various embodiments.

Cellular device 105 further comprises a cellular transceiver 111 coupled with bus 116 for communicating via cellular network 122. Examples of cellular networks used by cellular device 105 include, but are not limited to GSM: cellular networks, GPRS cellular networks, GDMA cellular networks, and EDGE cellular networks. Cellular device 105 further comprises a display 112 coupled with bus 116. Examples of devices which can be used as display 112 include, but are not limited to, liquid crystal displays, LED-based displays, and the like. It is noted that display 112 can be configured as a touch screen device (e.g., a capacitive touch screen display) for receiving inputs from a user as well as displaying data. Cellular device 105 further comprises an audio output 113 coupled with bus 116 for conveying audio information to a user. Cellular device 105 further comprises a Wi-Fi transceiver 114 and an inertial measurement unit (IMU) 115 coupled with bus 116. Wi-Fi transceiver 114 may be configured to operate on any suitable wireless communication protocol including, but not limited to WiFi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard).

Corrected Pseudorange Position Determination:
DGPS

Improvements in GNSS/GPS positioning may be obtained by using reference stations with a fixed receiver system to calculate corrections to the measured pseudoranges in a given geographical region. Since the reference station is located in a fixed environment and its location can be determined very precisely via ordinary survey methods, a processor associated with the Reference Station GNSS/GPS receivers can determine more precisely what the true pseudoranges should be to each satellite in view, based on geometrical considerations. Knowing the orbital positions via the GPS almanac as a function of time enables this process, first proposed in 1983, and widely adopted ever since. The difference between the observed pseudorange and the calculated pseudorange for a given reference station is called the pseudorange correction. A set of corrections for all the global navigation satellites 102 in view is created second by second, and stored, and made available as a service, utilizing GPS/GNSS reference stations 120 and correction services 121. The pseudoranges at both the cellular device 105 GPS receiver 107 and those at the reference stations 120 are time-tagged, so the corrections for each and every pseudorange measurement can be matched to the local cellular device pseudoranges. The overall service is often referred to as Differential GPS, or DGPS.

Without any corrections, GNSS/GPS receivers produce position fixes with absolute errors in position on the order of 4.5 to 5.5 m per the GPS SPS Performance Standard, $4^{th}$ Ed.

2008. FIG. 2 depicts correction services 121 conveying these corrections via a cellular network 122, or the Internet 123. Internet 123 is in turn coupled with a local Wi-Fi network 124 which can convey the corrections to cellular device 105 via Wi-Fi transceiver 114. Alternatively, cellular network 122 can convey the corrections to cellular device 105 via cellular transceiver 111. In some embodiments, correction services 121 are also coupled with a distribution service 125 which conveys the corrections to an FM radio distributor 126. FM radio distributor 126 can broadcast corrections as a terrestrial radio broadcast 103. It should be appreciated that an FM signal is being described as a subset of possible terrestrial radio broadcasts which may be in a variety of bands and modulated in a variety of manners.

In some embodiments, cellular device 105 includes one or more integral terrestrial radio antennas associated with integrated terrestrial receivers; FM radio receiver 108 is one example of such a terrestrial receiver which would employ an integrated antenna designed to operate in the correct frequency band for receiving a terrestrial radio broadcast 103. In this manner, in some embodiments, cellular device 105 can receive the corrections via FM radio receiver 108 (or other applicable type of integrated terrestrial radio receiver). In some embodiments, correction services 121 are also coupled with a distribution service 125 which conveys the corrections to a satellite radio distributor 127. Satellite radio distributor 127 can broadcast corrections as a broadcast from one or more communications satellites 101. In some embodiments, the cellular device 105 includes one or more integral satellite radio antennas associated with integrated satellite radio receivers 106. Satellite radio receiver 106 is one example of such a satellite receiver which would employ an integrated antenna designed to operate in the correct frequency band for receiving a corrections or other information broadcast from communication satellites 101. In this manner, in some embodiments, a cellular device 105 can receive the corrections via satellite radio receiver 106.

Many more sophisticated GNSS/GPS receivers have been designed to accept and implement DGPS corrections. However, many of the chipsets embedded in millions of existing cellular devices are not configured to support this correction method. In fact, they are not configured to even make pseudorange measurement data available to the cellular device internally. Conventionally, pseudorange data from these cellular device chipsets are only available under a limited set of conditions, usually only when performing a 911 service call, and then only for use by the Assisted GPS service located in conjunction with the E-911 service facility. Newer generations of chipsets may be configured to make use of differential corrections available from the Satellite-Based Augmentation Service, or SBAS. Various embodiments of the present technology describe ways to operate with these newer chipsets and will be discussed subsequently. The limitation of unavailability of pseudoranges from embedded GNSS/GPS chipset technology in conventional cellular telephones or other handheld devices may be overcome as described herein. The protocol defined by the Open Mobile Alliance for use in mobile phones for determining location based on an internal GPS chipset and other resources is called the Secure User Plane Location, abbreviated "SUPL." New software elements including algorithms for use in this kind of protocol are described herein.

Obtaining Pseudoranges from a Cellular device GPS Chipset

According to various embodiments, the system depicted in FIG. 2 provides components for implementing improved GPS/GNSS accuracy for a cellular device. It is noted that while the following discussion is directed to cellular devices specifically, embodiments are not limited to this use alone and can be implemented upon other mobile devices including, but not limited to, laptop computers, tablet computers, personal digital assistants (PDAs), handheld electronic devices, mobile navigation systems, and the like. For the purpose of brevity, like components described above with reference to FIG. 2 will not be described again in the present discussion. In accordance with various embodiments, a cellular device 105 is provided with a plurality of Application Programming Interface (API) function applications stored in cellular device memory and each are configured to be operated by processor 109 upon activation by the user, or automatically.

In FIG. 2, the cellular device 105 is configured with a pseudorange fetch component 221, a pseudorange correction fetch component 222, a pseudorange corrector 223, an augmented position determiner 224, a carrier phase fetch component 225, and a carrier phase smoothing component 226. In FIG. 2, pseudorange fetch 221 is configured to request a current set of pseudoranges from the GNSS/GPS receiver 107 generated by and resident in the cellular device 105. According to various embodiments, there are two methods for performing this request. In one embodiment, a 911 call function is activated which causes the GNSS/GPS receiver 107 to respond and put the current pseudoranges on the cellular device bus 116. These local pseudoranges are stored in memory and made available to components of the cellular device 105, such as the pseudorange corrector 223. Another embodiment can employ a fetch routine sanctioned and adopted by the SUPL Committee on cellular operations. Chipsets in the future will have built-in capability to respond to requests and output pseudoranges with time tags, as is available in more expensive chipsets used in non-cellular device products.

According to one embodiment, pseudorange fetch 221 notifies the pseudorange corrector 223 that the pseudorange information is being stored. According to one embodiment, the cellular device 105 receive pseudorange corrections directly from an improvement service, such as a correction feed 640, correction service 121, correction service 121, FM radio distribution 126, or satellite radio distributor 127, or a combination thereof, that is located outside of the cellular device, for example, without those pseudorange corrections being transmitted to the cellular device 105 through the GPS/GNSS chipset or receiver 107.

In one embodiment, in response to a positioning activity with cellular device 105 communication system 220 notifies the pseudorange correction fetch 221 to test to see if pseudorange corrections are in memory already, and if not notifies the pseudorange correction fetch that pseudorange corrections need to be fetched from an improvement source, such as a correction feed 640, correction service 121, correction service 121, FM radio distribution 126, or satellite radio distributor 127, or a combination thereof.

According to one embodiment, FIG. 2 depicts a cellular telephone 104 that includes memory 110 coupled with a bus 116, a Global Positioning System/Global Navigation Satellite System (GPS/GNSS) embedded receiver 107 coupled with the bus 116, a communications system 220 coupled with the bus 116, and a processor 109 coupled with the bus 116, wherein the processor 109 is configured to obtain pseudoranges indirectly from the GPS/GNSS embedded receiver 107 and to receive differential corrections via the communications system 220 and provide a position fix of the cellular telephone 105 based on processing of pseudoranges and the differential corrections.

According to one embodiment, the pseudoranges from the GPS/GNSS embedded receiver 107 are obtained by a command from the processor 109 to the GPS/GNSS embedded receiver 107 via a thin Secure User Platform Location (SUPL). According to one embodiment, the pseudoranges are obtained via a command emulating an initiated 911 call and activating an E-911 transmission, in order to activate and receive pseudorange delivery from a GNSS/GPS chipset that is part of the cellular telephone 105, and deactivating the E-911 transmission before the pseudoranges are transmitted to an emergency service. According to one embodiment, the pseudoranges are obtained by a command supported by a Secure User Platform Location (SUPL). According to one embodiment, the communications system 220 is a part of the cellular phone 105 and, therefore, is a cellular telephone system.

The blocks that represent features in FIGS. 1 and 2 can be arranged differently than as illustrated, and can implement additional or fewer features than what are described herein. Further, the features represented by the blocks in FIGS. 1 and 2 can be combined in various ways. The cellular device 100 or 105 can be implemented using hardware, hardware and software, hardware and firmware, or a combination thereof.

Examples of Methods for Obtaining Pseudorange Information

Figure 3:
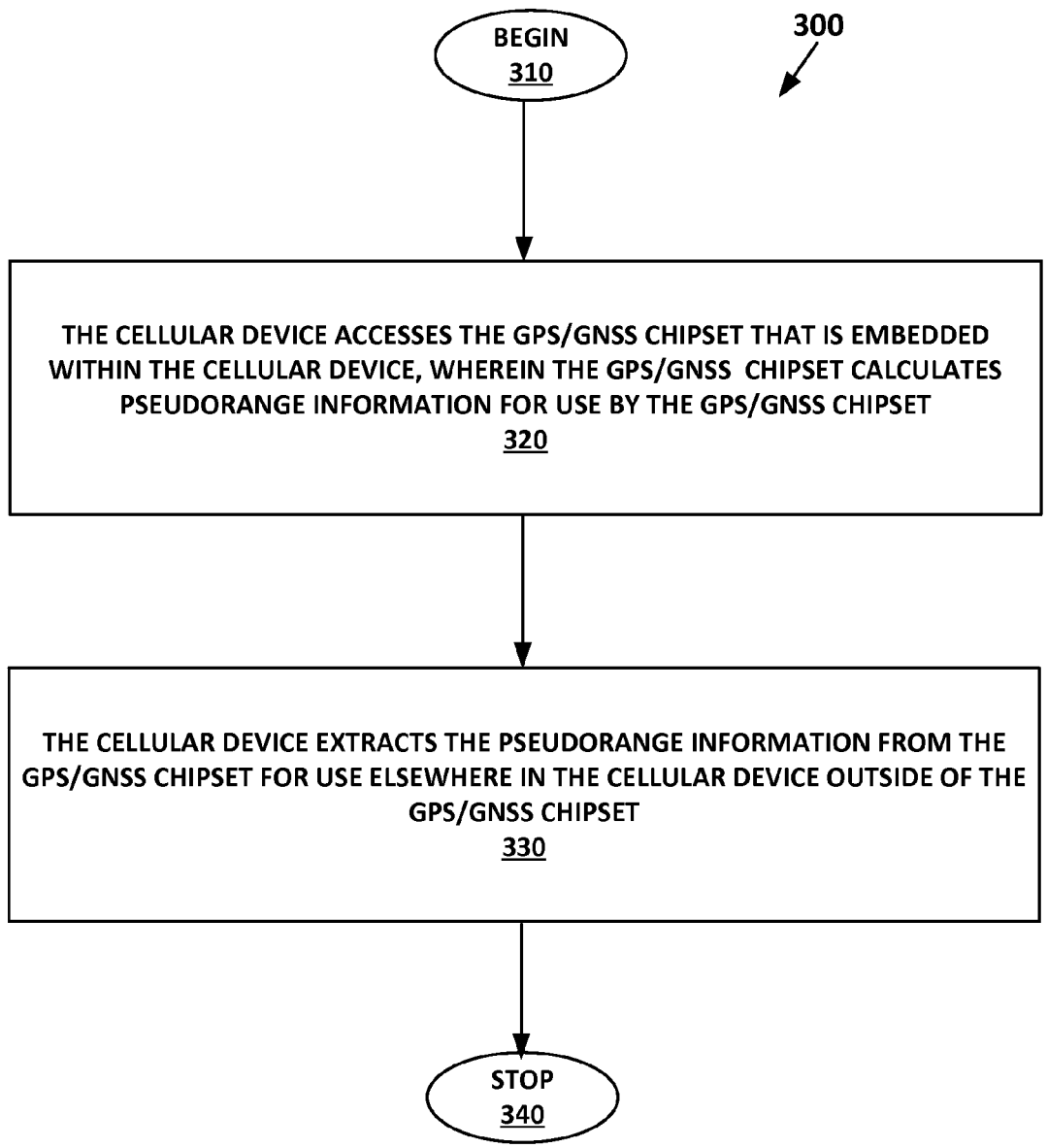
FIG. 3 depicts a flowchart of a method for obtaining pseudorange information using a cellular device, according to one embodiment.

FIG. 3 depicts a flowchart of a method for obtaining pseudorange information using a cellular device, according to one embodiment.

The following description shall refer to FIG. 1.

At 310, the method begins.

At 320, the cellular device 100 accesses the GPS/GNSS chipset 170 that is embedded within the cellular device 100. The GPS/GNSS chipset 170 calculates pseudorange information for use by the GPS/GNSS chipset 170. For example, the GPS/GNSS receiver 107 can perform GPS measurements to derive raw measurement data for a position of the cellular device 100. The raw measurement data provides an instant location of the cellular device 100. The GPS/GNSS chipset 170 calculates pseudorange information that is for use by the GPS/GNSS chipset 170. According to one embodiment, the raw measurement data is the pseudorange information that will be extracted. Examples of pseudorange information are uncorrected pseudorange information, differential GNSS corrections, high precision GNSS satellite orbital data, GNSS satellite broadcast ephermis data, and ionosopheric projections.

A chipset accessor 141, according to one embodiment, is configured for accessing the GPS/GNSS chipset 170. According to one embodiment, the chipset accessor 141 is a part of an SUPL client 701. For example, the SUPL client 701 can interface between the GPS/GNSS chipset 170 and the location manager 161, which resides in the operating system 160. The pseudorange information can be obtained from the processor 172 of the GPS/GNSS receiver 107 using a command via a high precision Secure User Platform Location (SUPL). According to one embodiment, the GPS/GNSS chipset 170 is accessed using an operation that is a session started with a message that is an improved accuracy Secure User Platform Location (SUPL) start message or a high precision SUPL INIT message. According to one embodiment, the message is a custom command that is specific to the GPS/GNSS chipset 170 and the improved accuracy SUPL client 701 can have access to the raw measurements of the GPS/GNSS chipset 170.

At 330, the cellular device 100 extracts the pseudorange information from the GPS/GNSS chipset 170 for use elsewhere in the cellular device 100 outside of the GPS/GNSS chipset 170. For example, a pseudorange information extractor 142 may be associated with a worker thread of the SUPL client 701. The worker thread can watch over the raw measurements delivered by the GPS/GNSS chipset 170 into the GPS/GNSS chipset 170's memory buffers and cache the raw measurements.

According to one embodiment, the raw measurement data is the pseudorange information that is extracted. According to one embodiment, the raw measurement data is pseudorange information that is calculated by the GPS/GNSS chipset 170 and is only for use by the GPS/GNSS chipset 170.

At 340, the method ends.

The extracted pseudorange information without further improvements can be used to provide an instant location. The extracted pseudorange information can be improved by applying pseudorange corrections, carrier wave information, or additional information, as described herein. The instant location or the improved location can be communicated to a location manager 162, as discussed herein, that displays the instant location or the improved location with respect to a map.

Figure 4A:
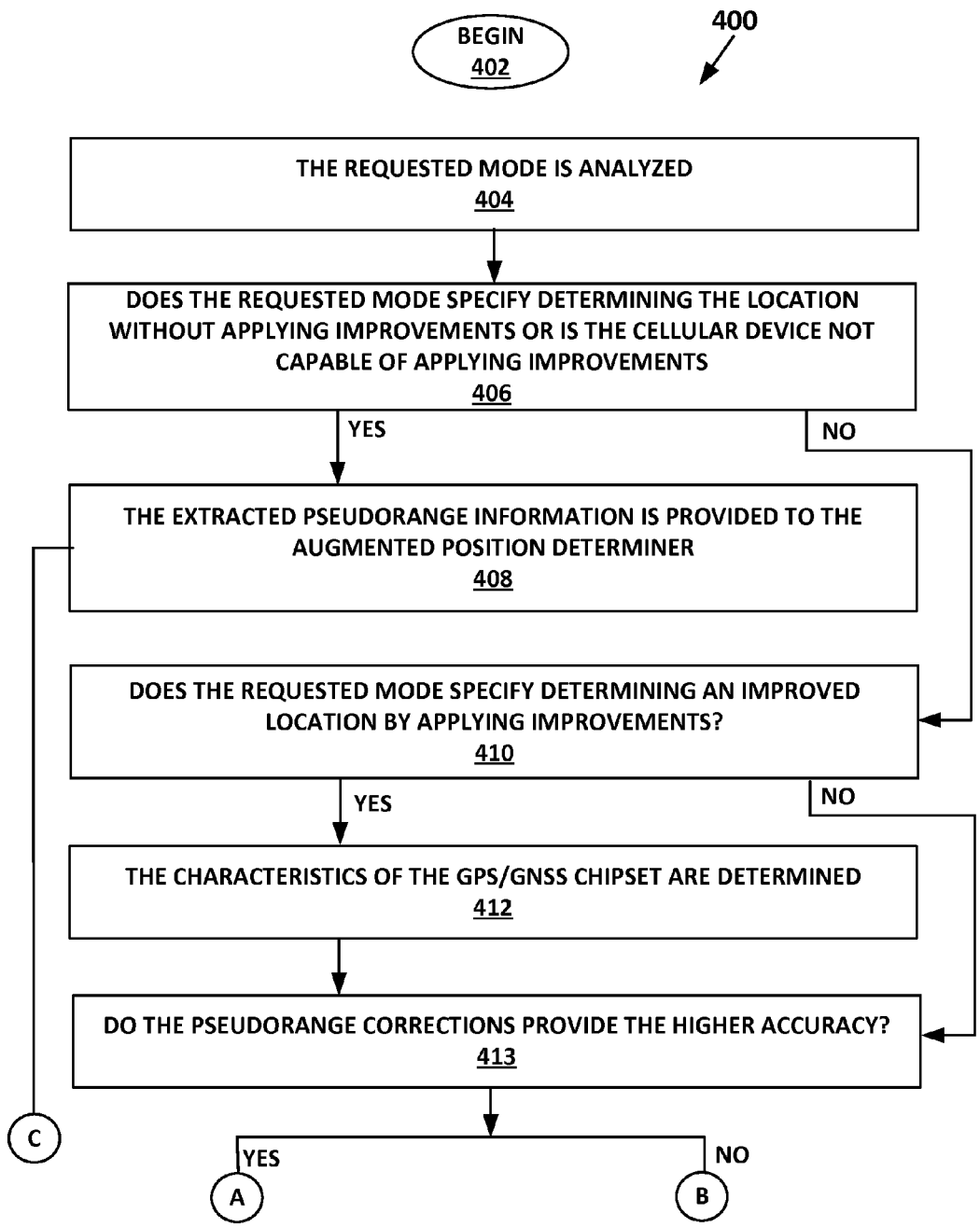
FIGS. 4A and 4B depict a flowchart 400 of a method for processing pseudorange information, according to one embodiment.
Figure 4B:
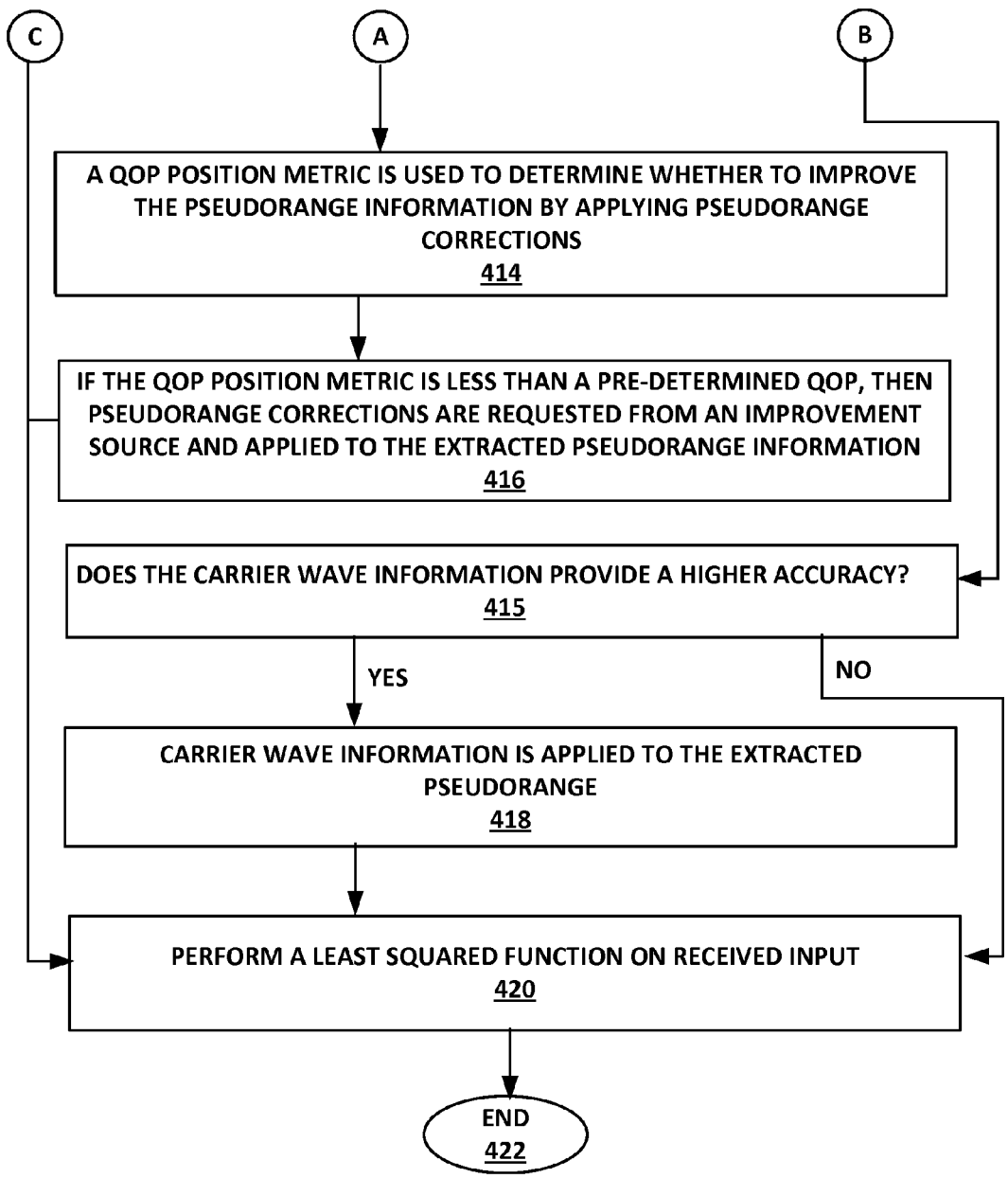

FIGS. 4A and 4B depict a flowchart 400 of a method for processing pseudorange information, according to one embodiment.

The following description shall refer to FIG. 1.

At 402, the method begins.

At 404, the requested mode is analyzed.

At 406, if requested mode specifies determining the location without applying improvements or if the cellular device is not capable of applying improvements, then at 408, the extracted pseudorange information is provided to the augmented position determiner 224 at 420, which performs a least squared function on the extracted pseudorange information. Otherwise, processing proceeds to 410.

At 410, if the requested mode specifies determining an improved location by applying improvements, then at 412 the characteristics of the GPS/GNSS chipset 170 are determined. For example, a determination can be made as to which of the pseudorange corrections or carrier phase information provided by the chipset 170 would provide the higher accuracy based on the GPS/GNSS chipset 170's characteristics. Otherwise, processing proceeds to 413.

If at 413 it is determined that the GPS/GNSS chipset 170's characteristics indicate that the pseudorange corrections would provide the higher accuracy, then at 414 a quality of position (QOP) position metric is used to determine whether to improve pseudorange information by applying pseudorange corrections. Otherwise, processing proceeds to 415. For example, a QOP position metric can be determined from data obtained from the GPS/GNSS receiver 107. If the QOP position metric is less than a pre-determined QOP, then at 416, pseudorange corrections are requested from an improvement source and the extracted pseudorange information is provided to the pseudorange corrector 223 which will apply pseudorange corrections to the extracted pseudorange information. Processing proceeds to operation 420 where a least squared function is performed on the corrected pseudoranges.

If at 415 it is determined that the GPS/GNSS chipset 170's characteristics indicate that the carrier wave information would provide the higher accuracy, then at 418 the extracted pseudorange information is provided to the carrier phase smoothing 226, which applies the carrier wave information to the extracted pseudorange information resulting in smoothed pseudoranges. Processing proceeds to 420 where the augmented position determiner 224 performs a least squared function on the smoothed pseudoranges.

At 420, the extracted pseudorange information from 408, the corrected pseudoranges from the pseudorange corrector 223 from 416, or the smoothed pseudoranges from the carrier phase smoothing 226 are provided at 420 to the augmented position determiner 224, which performs a least squared function on the received input.

According to one embodiment, the additional information applicator 151 can apply additional information to extracted pseudorange information, which are uncorrected and unimproved, corrected pseudoranges, or smoothed pseudoranges, for example, prior to being communicated to the augmented position determiner 224.

At 422, the method ends.

The pseudorange information bridger 143 can provide the output of the augmented position determiner 224 to the location manager 161 that resides in the operating system 160. The location displayer 162 of the location manager 161 can display the location with respect to a map.

Figure 5:
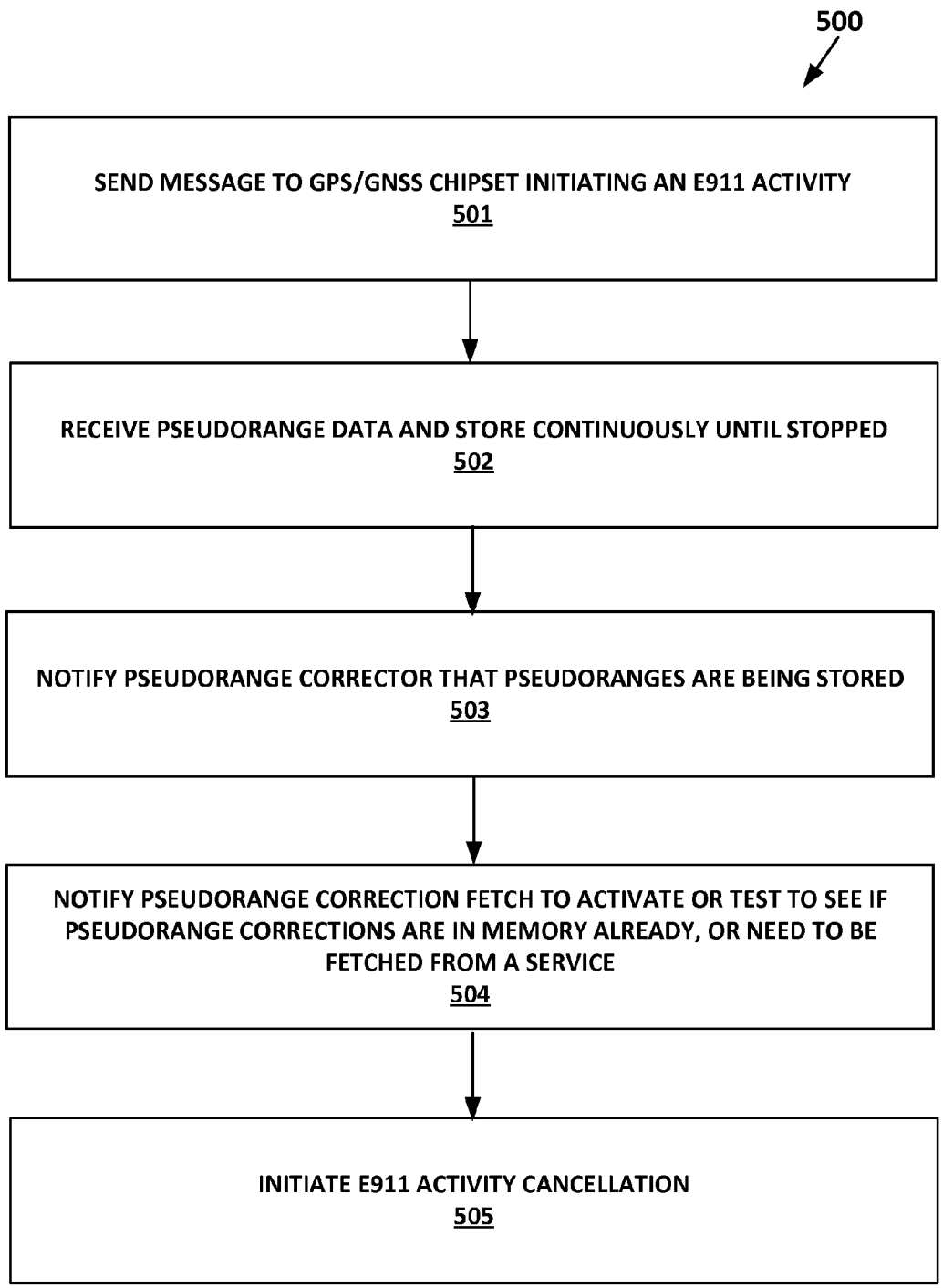
FIG. 5 is a flowchart 500 of a method for performing a pseudorange fetch operation in accordance with one embodiment.

FIG. 5 is a flowchart 500 of a method for performing a pseudorange fetch operation in accordance with one embodiment.

The following description shall refer to FIG. 2.

In various embodiments, pseudorange fetch 221 is the starting point for entering the augmented accuracy mode of operation and implements the operations of method described below in the context of flowchart 500. In one embodiment, there is a program listing available for the augmented accuracy mode of operation, as any ordinary application is made available, to a user of a cell phone such as an Android™, iPhone, or similar cell phone configured to utilize applications. Upon selecting this function and pressing a Start button, the following operations are performed.

In operation 501 of FIG. 5, a message is sent to the GPS/GNSS receiver 107 to initiate an E911 activity. As described above, pseudorange measurement data is typically not available internally to a cellular device 105, but can be made available when performing a 911 service call for use by the Assisted GPS service located in conjunction with the E911 facility. In operation 501, initiating an E911 activity enables placement of pseudorange measurement data onto the signal bus 116 of cellular device 105 for access by other components.

In operation 502 of FIG. 5, pseudorange data is received from the GPS/GNSS receiver 107 and stored on a continuous basis until terminated. In one embodiment, the pseudorange data is continuously received and stored (e.g., in memory 110) while the E911 activity is active. This makes the pseudorange data available for an extended period to components of cellular device 105. In one embodiment, pseudorange fetch 221 can retrieve the pseudorange data from memory 110.

In operation 503 of FIG. 5, a pseudorange corrector 223 is notified that pseudoranges are being stored. In one embodiment, pseudorange corrector 223 receives a message from pseudorange fetch 221 that pseudorange data is available for processing.

In operation 504 of FIG. 5, pseudorange correction fetch 222 is notified to determine if pseudorange corrections are in memory already, or need to be fetched from an improvement service. As will; be discussed in greater detail, pseudorange correction fetch 222, is configured to download pseudorange corrections from any of a variety of improvement source via any of several communications paths available to cellular device 105. In one embodiment, pseudorange fetch 221 generates a message to pseudorange correction fetch 222 to determine whether pseudorange corrections are already stored in memory 110, or need to be downloaded from an improvement source.

In operation 505 of FIG. 5, an E911 activity cancellation is initiated. In one embodiment, once pseudorange correction fetch 222 is notified to search for pseudorange corrections, the E911 activity is cancelled. According to one embodiment, this prevents actually completing a 911 call from cellular device 105 and inadvertently initiating an emergency response.

Obtaining and Processing Supplementary Data

Figure 6:
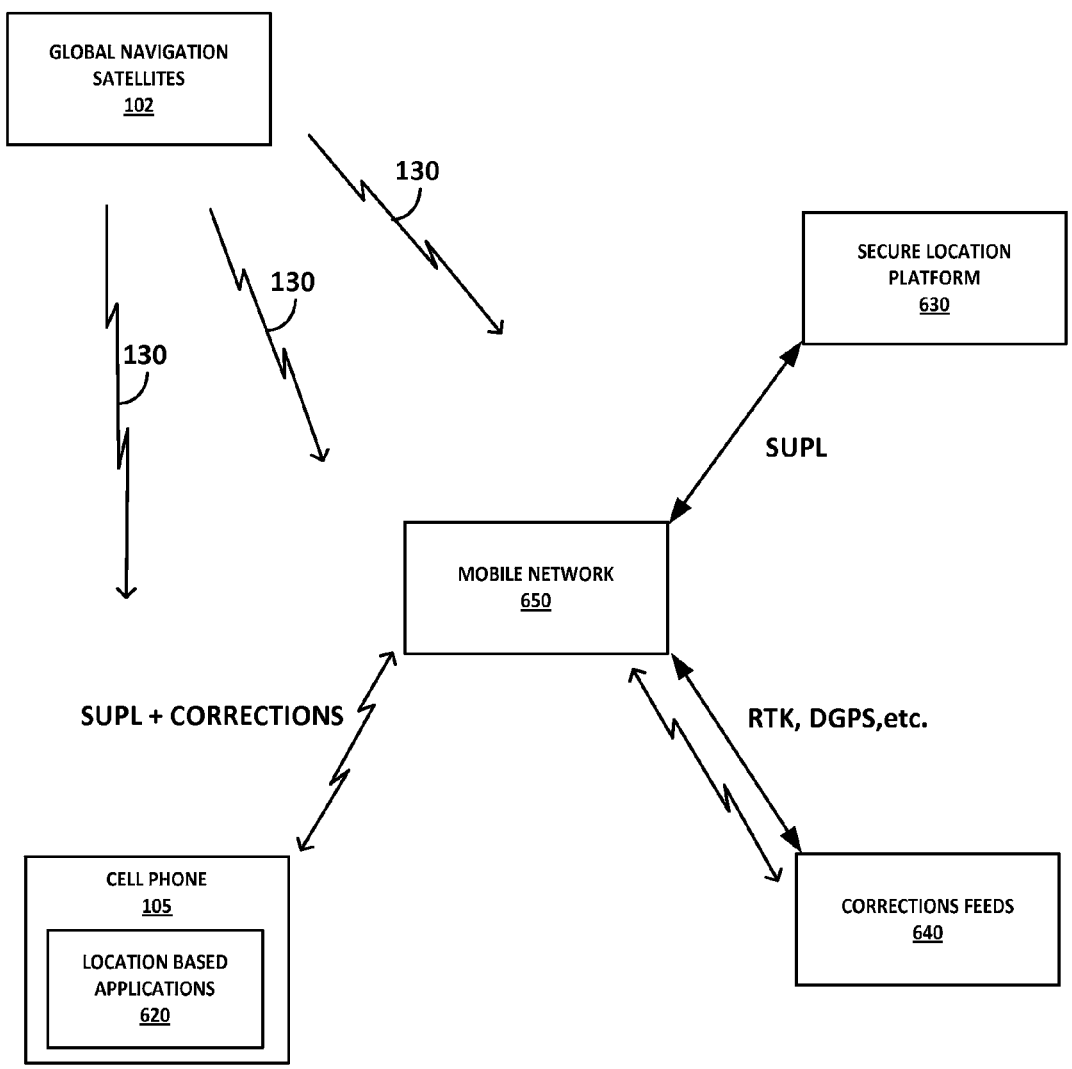
FIG. 6 shows components for implementing secure user plane location in accordance with one embodiment.

FIG. 6 shows components for implementing secure user plane location in accordance with one embodiment.

The description of FIG. 6 shall also refer to FIG. 2.

As described above, various embodiments are directed to improving the accuracy of position determination in cellular devices. In various embodiments, a number of data elements from onboard GPS/GNSS receiver 107, as well as other sensors, are used to provide data to a positioning engine. In accordance with various embodiments, the Secure User Platform Location protocol (SUPL) is used as the positioning protocol as well as the way to provide assistance and corrections to GPS/GNSS receiver 107 and for transferring the measurements being made to a cellular device 105 to the positioning engine. SUPL is a protocol defined by the Open Mobile Alliance for use in cellular devices 105 for determining the position of the cellular devices. In FIG. 6, global navigation satellites 102 are used to provide navigation signals as described above. Location based applications refers to applications resident upon a cellular device 105 which is configured as a SUPL enabled terminal in accordance with various embodiments. While shown as resident upon cellular device 105, location based applications 620 may reside elsewhere upon a network and may interact with cellular device 105 remotely.

In one embodiment, a SUPL Location Platform (SLP) 630 provides the back-end infrastructure needed to implement SUPL. Typically, SLP 630 is hosted by a network operator (e.g., the operator of cellular network 122) and handles the SUPL transaction with cellular device 105 to provide services such as E911, notifications, and verification. Corrections feeds 640 such as Real Time Kinematic (RTK) feeds and/or Differential GPS (DGPS) feeds comprises a service (e.g., correction services 121) which can provide data for improving the precision in determining the position of cellular device 105. This data may include, but is not limited to, high precision orbital data rather than or in addition to broadcast ephemeris data, DGPS corrections, improved ionospheric projections rather than a standard Kloubuchar model, accurate clock data, and other Real-Time Kinematics data that helps in precisely determining the position of cellular device 105.

Figure 7:
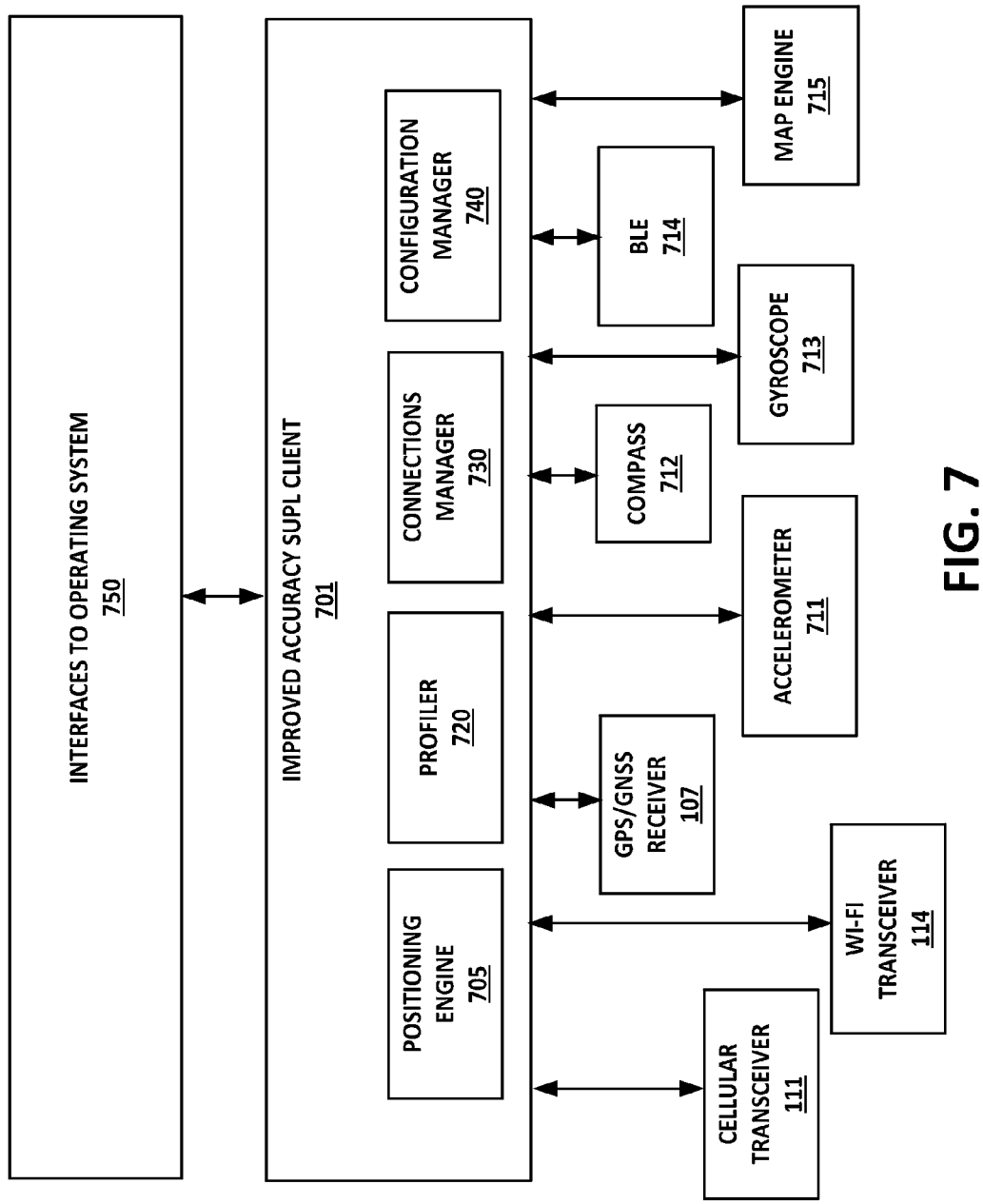
FIG. 7 is a block diagram showing components of an improved accuracy SUPL client in accordance with one embodiment.

FIG. 7 is a block diagram showing components of an improved accuracy SUPL client in accordance with one embodiment.

The following description of FIG. 7 shall refer to FIG. 2.

In FIG. 7, improved accuracy SUPL client comprises a positioning engine 705, profiler 720, connections manager 730, and configuration manager 740. It is noted that improved accuracy SUPL client 701 is shown as resident in memory 110 of cellular device 105 in accordance with various embodiments. Positioning engine 705 determines the position of cellular device 105 using raw GPS/GNSS measurements and cues from various sensors in cellular device 105. In accordance with one embodiment, positioning engine 705 is implemented as augmented position determiner 224. In accordance with various embodiments, positioning engine 705 can use data provided by, for example, corrections feeds 640. In accordance with various embodiments, positioning engine 705 can utilize algorithms to cancel multi-path signals, ground reflections and other echo, capacitance of the bearer and boost faint or broken signals. Positioning engine 705 can also query map engine 715 to obtain data about the surroundings. For example, positioning engine 705 can perform a first coarse positioning of cellular device 105 and then query map engine 715 about the area around the current position of cellular device 105. A rough description of the area around a cellular device 105 (e.g., how far away are walls surrounding the cellular device 105) can help determine the degree of signal processing that needs to be performed upon signals received from global navigation satellites 102. In accordance with one embodiment, positioning engine 705 can apply this algorithm iteratively until a desired quality of precision (QOP) is achieved. Profiler 720 is a component used by SUPL client 701 to understand the characteristics of the GPS/GNSS silicon and the other sensors present in the system. This process includes calibration and detection of feature set and capabilities of these components. This process could be initiated at the time of installation into cellular device 105, when first started or after a software, firmware or hardware upgrade to cellular device 105 or when the stored data is lost. This process could be triggered selectively or as a whole. It could also be triggered when new capabilities are expected by the SUPL Client 701. In addition to characterization of the device, this process also helps in identification of the command and data set of the GPS/GNSS receiver 107 and usage of the appropriate APIs. In one embodiment, the connections manager 730 is used by SUPL Client 701 to manage the connections with the components available on the network, for example the secure location platform 630, corrections feeds 640, and other data feeds. In one embodiment, configuration manager 740 stores the current operational parameters of SUPL Client 701 as mandated by the specification and other means. The configuration manager 740 also determines the degree of operation of the Positioning Engine 705.

Also shown in FIG. 7 are devices and data sources which provide data to position engine 705 in determining the position of cellular device 105. These include, but are not limited to, cellular transceiver 111, Wi-Fi transceiver 114, GPS/GNSS receiver 107, accelerometer 711, compass 712, gyroscope 713, a Bluetooth Low Energy (BLE) component 714, and map engine 715. It is noted that accelerometer 711 and gyroscope 713 may be integrated as IMU 115.

BLE component 714 refers to a low energy wireless radio technology which is intended for use in mobile devices such as cellular telephones. BLE component 714 is an example a short range, low energy wireless personal area networking component which typically operates and exchanges data wirelessly over short distances using short-wavelength radio transmissions in the ISM band (from 2400-2480 MHz) from fixed and/or mobile devices.

Figure 8:
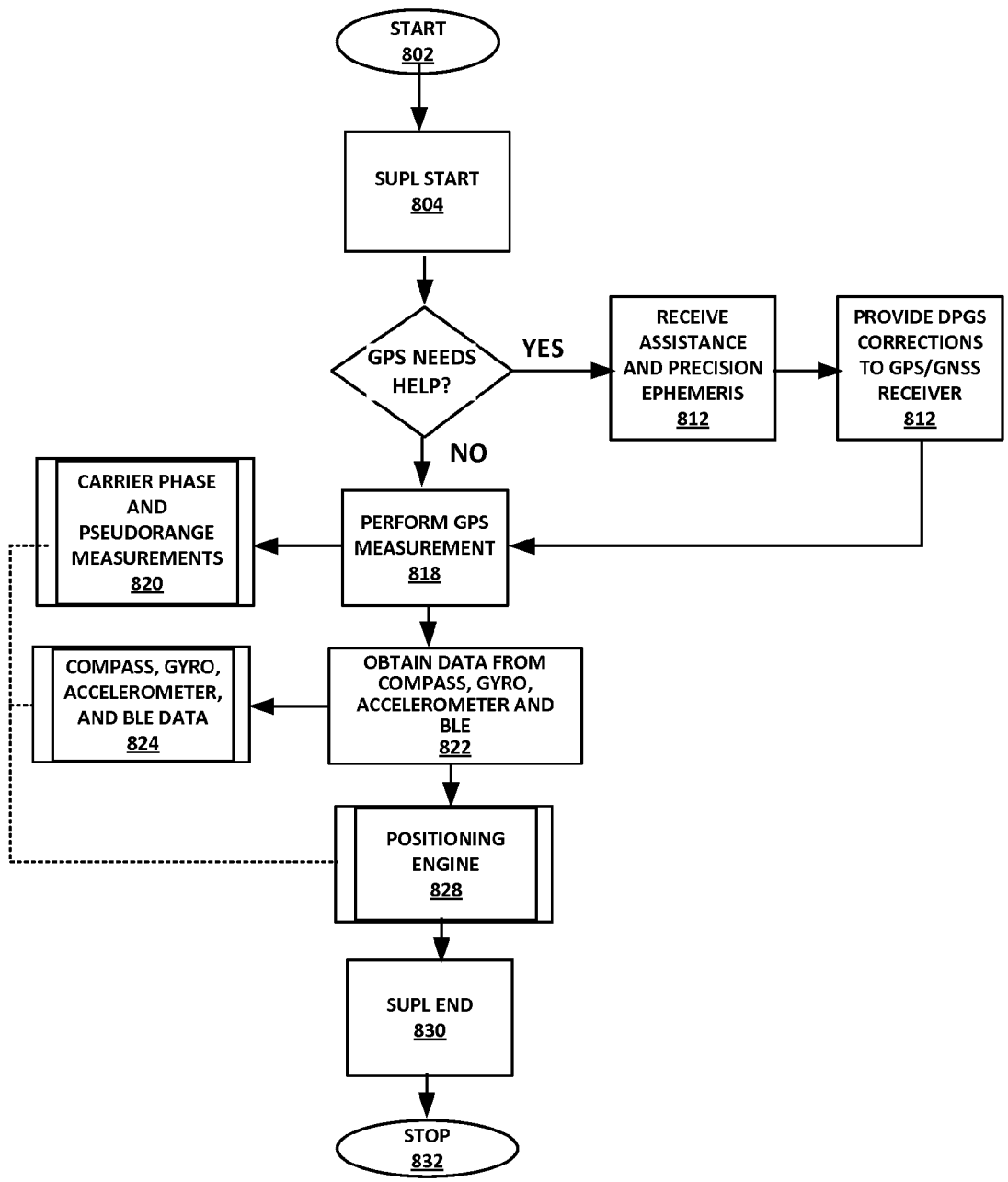
FIG. 8 depicts a flowchart 800 of a method for obtaining pseudorange information using a cellular device, according to one embodiment.

FIG. 8 depicts a flowchart 800 of a method for obtaining pseudorange information using a cellular device, according to one embodiment. According to one embodiment, the method depicted by flowchart 800 provides various embodiments for implementing corrections operations.

At 802, the method begins.

At 804, a Secure User Platform Location (SUPL) operation is initiated using a custom command that is specific to the GPS/GNSS chipset. The pseudorange information is accessed by a chipset accessor 141 (FIG. 1) and extracted by a pseudorange information extractor 142 (FIG. 1) using a custom command that is specific to the GPS/GNSS chipset 170 (FIG. 1), according to one embodiment.

At 806 a determination is made as to whether the GPS/GNSS receiver 107 needs assistance in determining a position of the cellular device 100 (FIG. 1) or 105 (FIG. 2) to achieve a desired level of Quality of Position (QOP).

At 812, if the GPS/GNSS receiver needs assistance, then additional data is received from satellites currently in view of the GPS/GNSS receive 107 (FIGS. 1 and 2). Examples of addition data are acquisition assistance data, high precision ephemeris data, and DGPS/DGNSS corrections).

At 816, the DGPS corrections are provided to the GPS/GNSS receiver 107. For example, the DGPS corrections data (e.g., as well as the other data received in operation 812) are provided to the GPS/GNSS receiver 107 (FIGS. 1 and 2).

At 818, GPS measurements are performed at the GPS/GNSS receiver 107 to derive raw measurement data of a position of the cellular device 100 (FIG. 1) or 105 (FIG. 2). For example, GPS/GNSS receiver 107 (FIGS. 1 and 2) performs GPS measurements to derive raw measurement data of the position of cellular device 100 (FIG. 1) or 105 (FIG. 2).

At 820, carrier phase and pseudorange signals are measured from one or more satellites that are in view of the GPS/GNSS embedded receiver 107 (FIGS. 1 and 2). For example, an operation in which carrier phase and pseudorange measurements of signals from each satellite in view of GPS/GNSS receiver 107 (FIGS. 1 and 2) is performed.

At 822, additional information is obtained from one or more of a compass, gyroscope, accelerometer, and a source accessed via a wireless communication protocol operating in the range of frequencies between 2402-2480 MHz, such as, such as Bluetooth Low Energy (BLE)®. For example, data from compass 712, gyroscope 713, accelerometer 711, and/or BLE 714 (FIG. 7) is obtained. In one embodiment, improved accuracy SUPL client 701 (FIG. 7) obtains accumulated data from various sensors that may be resident upon cellular device 100 (FIG. 1) or 105 (FIG. 2) such as gyroscope 713, accelerometer 711 (e.g., IMU 115), compass 712 (FIG. 7), etc., for the past n seconds. In accordance with one embodiment, if indoor positioning is enabled improved accuracy SUPL client 701 (FIG. 7) obtains readings from BLE radios that may be present in the area.

At 824, the data from the compass, gyroscope, accelerometer, and the BLE are sent. For example, the data from compass 712, gyroscope 713, accelerometer 711, and/or BLE 714 (FIG. 7) is sent by improved accuracy SUPL client 701 (FIG. 7).

At 828, a more precise location of the cellular device 100 (FIG. 1) or 105 (FIG. 2) is generated based on the corrected data. For example, positioning engine 705 (FIG. 7) processes the data received in operation 824. In one embodiment, positioning engine 705 uses the positioning cues provided from these inputs (e.g., compass 712, gyroscope 713, accelerometer 711, and/or BLE 714) to generate a precise position of cellular device 100 (FIG. 1) or 105 (FIG. 2). In one embodiment, operations 818, 820, 822, 824, 824 are repeated until a desired Quality of Positioning (QOP) level is achieved in determining the position of cellular device 100 (FIG. 1) or 105 (FIG. 2).

If an E-911 call is used to initiate the operation, then at 830, the pseudorange information is prevented from being delivered to the originally intended recipient, such as an emergency service, according to one embodiment, by terminating the SUPL operation before the pseudorange information is delivered to the originally intended recipient. For example, the SUPL session using improved accuracy SUPL client 701 (FIG. 7) is terminated at 830.

If a GPS/GNSS chip custom command is used to initiate the operation, then, at 830, the pseudorange information is accessed by the chipset accessor 141 (FIG. 1) and extracted by the pseudorange information extractor 142 (FIG. 1), as discussed herein.

In one embodiment, one the position of cellular device 100 (FIG. 1) or 105 (FIG. 2) is determined within the desired QOP parameters, the position of cellular device 100 (FIG. 1) or 105 (FIG. 2) is delivered to the application which generated a request of the position of cellular device 100 (FIG. 1) or 105 (FIG. 2).

At 832, the method ends.

According to one embodiment, an E-911 call is used to obtain pseudorange information from a GPS/GNSS chipset. The following is a description of flowchart 800 in the event that E-911 call is used.

At 802, the method begins.

At 804, a Secure User Platform Location (SUPL) operation is initiated that is intended for delivering the pseudorange information from the GPS/GNSS receiver of the cellular device to a recipient originally intended by the operation. According to one embodiment, operation 420 further comprises operation 804. Examples of pseudorange information are uncorrected pseudorange information, pseudorange corrections from correction feeds, high precision orbital data, broadcast ephemeris data, Differential GPS (DGPS) corrections, and improved ionosphere projections. According to one embodiment, the operation is a session that is started with a message selected from a group consisting of a Secure User Platform Location (SUPL) start message and an SUPL INIT message. The pseudorange information is accessed and redirected to the different recipient that was not originally intended by the operation.

The other operations 806, 812, 816, 818, 820, 822, 824, 826, 828 are performed as described herein.

At 830, the pseudorange information is prevented from being delivered to the originally intended recipient by terminating the SUPL operation before the pseudorange information is delivered to the originally intended recipient. For example, the SUPL session using improved accuracy SUPL client 701 is ended.

At 832, the method ends.

Although specific operations are disclosed in flowcharts 300, 400, 500, and 800, such operations are exemplary. That is, embodiments of the present invention are well suited to performing various other operations or variations of the operations recited in flowcharts 300, 400, 500, and 800. It is appreciated that the operations in flowcharts 300, 400, 500, and 800 may be performed in an order different than presented, and that not all of the operations in flowcharts 300, 400, 500, and 800 may be performed.

Non-Transitory Computer Readable Storage Medium

Any one or more of the embodiments described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments of the present invention. According to one embodiment, the non-transitory computer readable storage medium is tangible.

The following description of a non-transitory computer readable storage medium, according to various embodiments, refers to FIG. 1. According to one embodiment, a non-transitory computer readable storage medium is provided that comprises instructions, which when executed causes a processor 109 of a cellular device 100, which is not a part of an embedded Global Positioning System/Global Navigation Satellite System (GPS/GNSS) receiver 107 of the cellular device 100, to perform a method for obtaining pseudorange information using a cellular device 100. The method comprises accessing, performed by the cellular device 100, a GPS/GNSS chipset 170 embedded within the cellular device 100, wherein the GPS/GNSS calculates pseudorange information for use by the GPS/GNSS chipset 170; and extracting, performed by the cellular device 100, the pseudorange information from the GPS/GNSS chipset 170 for use elsewhere in the cellular device 100 outside of the GPS/GNSS chipset 170. A location of the cellular device 100 can be determined based on the pseudorange information. A pseudorange correction fetch 222 (FIG. 2) is notified to test to see if pseudorange corrections are in memory 110 (FIG. 2) already. The pseudorange corrections are received directly from an improvement source that is located outside of the cellular device 100. The pseudorange information is processed in a portion of the cellular device 100 that is outside of the GPS/GNSS chipset 170 to determine a position fix of the cellular device 100. The pseudorange information is processed using one or more Application Programming Interface (API) function applications that reside in memory of the cellular device 100 and are executed by the processor 109 of the cellular device 100. Additional information is obtained from one or more of a compass, gyroscope, accelerometer, and a source accessed via a WiFi or via a short range wireless communication protocol operating in the range of frequencies between 2402-2480 MHZ. Corrected data is created based on the obtained additional information and a location of the cellular device 100 is generated based on the corrected data. The pseudorange information extractor extracts at least four pseudorange measurements as a part of extracting the pseudorange information from the GPS/GNSS chipset 170. A quality of position (QOP) position metric is determined from data obtained from a GPS/GNSS receiver 107 associated with the GPS/GNSS chipset 170. If the QOP position metric is less than a pre-determined QOP, then pseudorange corrections are requested from an improvement source.

Conclusion

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of obtaining pseudorange information using a cellular device, the method comprising;
    sending, performed by the cellular device, a message to a Global Positioning System/Global Navigation Satellite System (GPS/GNSS) chipset embedded within the cellular device to initiate an E911 activity, wherein the GPS/GNSS chipset calculates pseudorange information for use by the GPS/GNSS chipset;
    receiving, performed by the cellular device, the pseudorange information from the GPS/GNSS chipset for use elsewhere in the cellular device outside of the GPS/GNSS chipset, the pseudorange information provided by the E911 activity; and
    sending, performed by the cellular device, a message to the GPS/GNSS chipset to cancel the E911 activity before transmission of the pseudorange information external to the cellular device.

2. The method as recited by claim 1, wherein the E911 activity is initiated using an improved accuracy SUPL client of the cellular device.

3. The method as recited by claim 1, wherein the pseudorange information is provided from the GPS/GNSS chipset to a location manager portion of an operating system of the cellular device, wherein the location manager is external to the GPS/GNSS chipset.

4. The method as recited by claim 1, wherein the cellular device is selected from a group consisting of a cell phone and a non-voice enabled cellular device.

5. The method as recited by claim 1, wherein the method further comprises:
    determining a location of the cellular device based on the pseudorange information.

6. The method as recited by claim 5, wherein the method further comprises:
    displaying the location of the cellular device on a display of the cellular device.

7. The method as recited by claim 1, wherein the method further comprises:
    performing at a GPS/GNSS receiver associated with the GPS/GNSS chipset, GPS measurements to derive raw measurement data for a position of the cellular device.

8. The method as recited by claim 7, wherein the raw measurement data provides an instant location of the cellular device.

9. The method as recited by claim 1, wherein the method further comprises:
    determining carrier phase and pseudorange signals from one or more satellites that are in view of a GPS/GNSS embedded receiver associated with the GPS/GNSS chipset.

10. The method as recited by claim 1, wherein the E911 activity is initiated using a command via a high precision Secure User Platform Location (SUPL).

11. The method as recited by claim 1, wherein the method further comprises:
    storing the pseudorange information continuously.

12. The method as recited by claim 1, wherein the method further comprises:
    notifying a pseudorange corrector that the pseudorange information is being stored.

13. The method as recited by claim 1, wherein the method further comprises:
    notifying a pseudorange correction fetch to test to see if pseudorange corrections are in memory already.

14. The method as recited by claim 13, wherein the method further comprises:
    receiving the pseudorange corrections directly from an improvement source that is located outside of the cellular device.

15. The method as recited by claim 1, wherein the method further comprises:
    notifying a pseudorange correction fetch that pseudorange corrections need to be fetched from an improvement source.

16. The method as recited by claim 1, wherein the method further comprises:
    processing the pseudorange information in a portion of the cellular device that is outside of a GPS/GNSS receiver that is part of the GPS/GNSS chipset to determine a position fix of the cellular device.

17. The method as recited by claim 1, wherein the method further comprises:
    processing the pseudorange information using one or more Application Programming Interface (API) function applications that reside in memory of the cellular device and are executed by a processor of the cellular device.

18. The method as recited by claim 1, wherein the pseudorange information is observed pseudorange information and wherein method further comprises:
    matching calculated pseudorange correction information from reference stations with the observed pseudorange information based on time tags.

19. The method as recited by claim 1, wherein the method further comprises:
    obtaining additional information from one or more of a compass, gyroscope, accelerometer, and a source accessed via a WiFi or via a short range wireless communication protocol operating in the range of frequencies between 2402-2480 MHZ;
    creating corrected data based on the obtained additional information; and
    generating a location of the cellular device based on the corrected data.

20. The method as recited by claim 1, wherein the method further comprises:
    communicating a location of the cellular device to another electronic device that is remotely located with respect to the cellular device.

21. The method as recited by claim 1, wherein the pseudorange information is selected from a group consisting of uncorrected pseudorange information, differential GNSS corrections, high precision GNSS satellite orbital data, GNSS satellite broadcast ephemeris data, and ionospheric projections.

22. The method as recited by claim 1, wherein initiating the E911 activity comprises:

using an operation that is a session started with a message selected from a group consisting of a improved accuracy Secure User Platform Location (SUPL) start message and a high precision SUPL INIT message.

23. The method as recited by claim 1, wherein the method further comprises:
   determining a quality of position (QOP) metric from data obtained from a GPS/GNSS receiver associated with the GPS/GNSS chipset;
   determining if the QOP position metric is less than a pre-determined QOP metric; and
   in response to the QOP position metric being less than the pre-determined QOP metric, requesting pseudorange corrections from an improvement source.

24. The method as recited by claim 23, wherein the requested pseudorange corrections are selected from a group consisting of satellite orbital data, high precision ephemeris data, and DGPS/DGNSS corrections.

25. The method as recited by claim 1, wherein the method further comprises:
   storing the pseudorange information in a memory of the cellular device.

26. A non-transitory computer readable storage medium comprising instructions, which when executed causes a processor of a cellular device, which is not a part of an embedded Global Positioning System/Global Navigation Satellite System (GPS/GNSS) receiver of the cellular device, to perform a method for obtaining pseudorange information using a cellular device, the method comprising:
   sending, performed by the cellular device, a message to a Global Positioning System/Global Navigation Satellite System (GPS/GNSS) chipset embedded within the cellular device to initiate an E911 activity, wherein the GPS/GNSS chipset calculates pseudorange information for use by the GPS/GNSS chipset;
   receiving, performed by the cellular device, the pseudorange information from the GPS/GNSS chipset for use elsewhere in the cellular device outside of the GPS/GNSS chipset, the pseudorange information provided by the E911 activity; and
   sending, performed by the cellular device, a message to the GPS/GNSS chipset to cancel the E911 activity before transmission of the pseudorange information external to the cellular device.

27. The non-transitory computer readable storage medium as recited by claim 26, wherein the method further comprises:
   determining a location of the cellular device based on the pseudorange information.

28. The non-transitory computer readable storage medium as recited by claim 26, wherein the method further comprises:
   notifying a pseudorange correction fetch to test to see if pseudorange corrections are in memory already.

29. The non-transitory computer readable storage medium as recited by claim 28, wherein the method further comprises:
   receiving the pseudorange corrections directly from an improvement source that is located outside of the cellular device.

30. The non-transitory computer readable storage medium as recited by claim 29, wherein the method further comprises:
   processing the pseudorange information in a portion of the cellular device that is outside of the GPS/GNSS chipset to determine a position fix of the cellular device.

31. The non-transitory computer readable storage medium as recited by claim 29, wherein the method further comprises:
   processing the pseudorange information using one or more Application Programming Interface (API) function applications that reside in memory of the cellular device and are executed by the processor of the cellular device.

32. The non-transitory computer readable storage medium as recited by claim 26, wherein the method further comprises:
   obtaining additional information from one or more of a compass, gyroscope, accelerometer, and a source accessed via a WiFi or via a short range wireless communication protocol operating in the range of frequencies between 2402-2480 MHZ;
   creating corrected data based on the obtained additional information; and
   generating a location of the cellular device based on the corrected data.

33. The non-transitory computer readable storage medium as recited by claim 26, wherein receiving the pseudorange information from the GPS/GNSS chipset further comprises:
   receiving at least four pseudorange measurements.

34. The non-transitory computer readable storage medium as recited by claim 26, wherein the method further comprises:
   determining a quality of position (QOP) metric from data obtained from a GPS/GNSS receiver associated with the GPS/GNSS chipset;
   determining if the QOP position metric is less than a pre-determined QOP metric; and
   in response to the QOP position metric being less than the pre-determined QOP metric, requesting pseudorange corrections from an improvement source.

35. The non-transitory computer readable storage medium as recited by claim 26, wherein the method further comprises:
   storing the pseudorange information in a memory of the cellular device.

* * * * *